United States Patent [19]

Leclerc de Bussy

[11] Patent Number: 4,787,917

[45] Date of Patent: Nov. 29, 1988

[54] METHOD FOR PRODUCING TORREFIED WOOD, PRODUCT OBTAINED THEREBY, AND APPLICATION TO THE PRODUCTION OF ENERGY

[76] Inventor: Jacques Leclerc de Bussy, 80290 Poix de Picardie, Bussy, France

[21] Appl. No.: 10,975

[22] PCT Filed: May 26, 1986

[86] PCT No.: PCT/FR86/00177

§ 371 Date: Jan. 9, 1987

§ 102(e) Date: Jan. 9, 1987

[87] PCT Pub. No.: WO86/06930

PCT Pub. Date: Dec. 4, 1986

[30] Foreign Application Priority Data

| May 24, 1985 | [FR] | France | 85 07839 |
| Oct. 7, 1985 | [FR] | France | 85 14792 |
| Jan. 10, 1986 | [FR] | France | 86 00307 |
| Feb. 13, 1986 | [FR] | France | 86 01969 |

[51] Int. Cl.$^4$ ............................ C10L 5/00; C10L 5/44
[52] U.S. Cl. ........................................ 44/606; 44/590
[58] Field of Search ............... 44/1 E, 10 B, 10 C, 44/10 A, 1 D, 606, 590

[56] References Cited

U.S. PATENT DOCUMENTS

| 4,231,302 | 11/1980 | Linneborn | 110/229 |
| 4,295,822 | 10/1981 | Campbell | 423/29 |
| 4,338,985 | 7/1982 | Smith et al. | 144/34 R |
| 4,553,978 | 11/1985 | Yvan | 44/1 E |

FOREIGN PATENT DOCUMENTS 7900610 7/1979 PCT Int'l Appl.

*Primary Examiner*—Carl F. Dees
*Attorney, Agent, or Firm*—Watson, Cole, Grindle & Watson

[57] ABSTRACT

New product consisting of wood which is torrefied between 250° and 280° C. in a non oxidizing atmosphere, in the form of sticks of uniform length: 15 mm for example and having a diameter comprised between 5 and 20 mm, which are not disbarked. The preparation of the method comprised the obtention by culture of rectilinear ligneous rejections, the cutting, drying and torrefaction thereof preferably in a vertical reactor (101) where the material to be torrefied (115) is traversed by a gas stream circulating at high speed.

18 Claims, 4 Drawing Sheets

METHOD FOR PRODUCING TORREFIED WOOD, PRODUCT OBTAINED THEREBY, AND APPLICATION TO THE PRODUCTION OF ENERGY

BACKGROUND OF THE INVENTION

1. Field of the Invention

The present invention relates to a product originating from the torrefaction of pieces of wood, to a process for the production of this substance and to a particular application of this product.

2. The Prior Art

It is known that wood which is heated to a temperature of approximately 200° to 300° C. becomes what may be called "torrefied wood", i.e., a product with a high fixed carbon content, a high calorific value, a very low moisture content, (approximately 3%), and which is non-hygroscopic and rot-proof, having retained practically all the pyroligneous compounds.

It has been proposed to bring woody pieces of different origins to the state of torrefied wood in order to agglomerate them using an added binder (FR-A-953,004) or using the tars produced by the wood itself as the binder (CH-A-228,877), to produce a fuel therefrom.

It has also been proposed (EP-A-007,374) to use wood torrefied under a neutral atmosphere without subsequent agglomeration, especially as fuel.

A drawback of torrefied wood, as proposed until now, is that it is produced from waste from forest plantations or from the wood industry, i.e., from materials of very irregular shape and composition. A product which itself is irregular, and which has a variable particle size and especially a wide particle size range results therefrom. Because of this, a product which does not lend itself well to automatic treatment is obtained, due to the fact that it is subject to blockages or vault formations during its movement, and that its permeability, in bulk, is very irregular. These defects may be overcome for example by cutting pieces of wood to uniform size, or by agglomerating fine particles, especially sawdust, but these operations are expensive, and thus reduce the economic advantage of torrefied wood.

The object of the invention is to provide a process for the production of thermal energy from torrefied wood which is more advantageous from the point of view of its regularity and its cost than similar processes currently known.

Another object of the invention is to provide, by way of new products, torrefied wood obtained as intermediate in the above process, the process of its production itself comprising the first stages of this process of thermal energy production. It is clear that the fact of being able to provide the product for other uses is an additional cause for the lowering of energy cost, due to a better use of the investment.

SUMMARY OF THE INVENTION

Consequently, the invention provides a process for the production of thermal energy, comprising the torrefaction of pieces of wood at a temperature of 250° to 280° C. in a non-oxidizing atmosphere, followed by a cooling and a combustion of the torrefied pieces of wood, defined in that it comprises the following stages:

(a) cultivation of crops capable of giving, after cutting, substantially straight woody suckers of diameter between 5 and 20 mm, the cultivation of the crops being carried out so as to obtain the suckers;

(b) harvesting the suckers, followed by a sectioning of the latter into unbarked "green" pieces of stick, of uniform length, of between approximately 10 and 25 mm;

(c) thermal treatment of the green pieces of stick comprising a drying followed by a torrefaction between 250° and 280° C.;

(d) cooling; and (e) combustion of the torrefied product in a plant of automated operation.

The invention also provides a process for the production of the product which can be used especially for thermal energy production, this process comprising the torrefaction of pieces of wood at a temperature of 250° to 280° C. in a non-oxidizing atmosphere; followed by a cooling, defined in that it comprises the following stages:

(a) cultivation of crops capable of giving, after cutting, substantially straight woody suckers of diameter between 5 and 20 mm; the cultivation of the crops being carried out so as to obtain the suckers;

(b) harvesting the suckers, followed by a sectioning of the latter into unbarked "green" pieces of stick, of uniform length, of between approximately 10 and 25 mm;

(c) thermal treatment of the green pieces of stick comprising a drying followed by a torrefaction between 250° and 280° C.; and (d) cooling.

The invention also provides a new product originating from the torrefaction between 250° and 280° C. of woody fragments, defined in that it is essentially in the form of small pieces of stick of diameter between 5 and 20 mm; which are unbarked and of uniform length of between approximately 10 and 25 mm.

The sectioning operations provide green pieces of stick of uniform length and which are more or less equal in their mean diameter, which is the most favorable configuration for subsequent automatic treatments because this configuration leads to more regular flows in bulk, with very constant natural slopes and a very high and also uniform permeability in bulk.

Preferably, the cultivation comprises the production of rooted stumps of the crops and periodic cuttings of the suckers above the level of the collar of each plant, the successive cuttings being carried out at increasing heights, at least until the density of suckers per unit surface area reaches the desired value.

It is understood that it is an "industrial" type of cultivation, much closer to cereals than to conventional forest plantations, and that it can easily be mechanized, with equipment similar to, and sometimes the same as, those used in cereal farming.

Advantageously, the cutting is carried out when the suckers are 1.5 to 2 meters in height, and preferably after leaf drop. A higher uniformity in the shape of the sections is thereby obtained, as the diameter of the long suckers varies slowly from the base to the terminal bud, and the absence of leaves removes the need for a subsequent grading, facilitating the positioning on an automatic sectioning machine at the same time.

Advantageously, the sectioning is carried out immediately after cutting. All transport and handling problems are thereby avoided.

According to an advantageous embodiment, the sectioning is carried out by aligning the cut suckers parallel to one another, and by passing them before a series of rotary blades. Sections of equal length are thereby obtained, with simple machines.

An important step in the process is the torrefaction. In effect, beyond a temperature of the order of 250° C., the conversion of the wood becomes exothermic, and, in the presence of air, if the reaction is not well controlled, there is a risk of catching fire. It is therefore known that the use of a neutral atmosphere is preferable.

According to a preferred embodiment of the invention, use is made of the fact that the "green" sections just like the torrefied sections, have, in bulk, a high and regular gas permeability, although each individual section is not permeable. A torrefaction method defined as follows is used: a mass of sections to be torrefied is placed in a reactor, a non-oxidizing gas is circulated through this mass, this gas penetrating into the mass at a temperature greater than that of torrefaction, passing through the mass by first passing over the undried or partially dried sections, and leaving the mass by passing over the sections nearing completion of torrefaction and the gas circulation speed is only slightly lower than that which would cause the torrefied sections to be carried away by the stream of gas.

The procedure of co-current circulation of gases results firstly in a sudden heating of the green sections, with a quick removal of water which leads to a large pore opening, and secondly to only a small difference in temperature between the sections nearing completion of torrefaction and the gas surrounding them, which makes it easier to control the reaction, especially with a view to preventing it from overspeeding. However, the gases circulate at high speed, which facilitates the achievement of homogeneous temperatures. This speed is facilitated by the permeability of the mass.

Preferably, the non-oxidizing gas circulates in part in a closed circuit, and essentially consists of water vapor originating from the sections and combustion gas coming from a burner intended for increasing the temperature of the gas. The high thermal capacity of the steam facilitates the exchanges; moreover, this steam has the advantage of being free in this case. Additionally, it is neither toxic nor polluting.

Advantageously, a part of the said gas is cooled and a part of its water removed, and it is then passed through the mass which has just been torrefied, in order to cool it and to prevent the initiation of exothermic reactions. A particularly valuable system is thereby formed, as the thermal capacity of the steam is once again used for the regulation of the satisfactory operation of the process.

The above embodiments enable very short operating times to be used, and advantageously, the time for torrefaction, from the point at which the product reaches 100° C., does not exceed ten minutes. This makes it even easier to regulate the operation, as the time during which exothermic reactions may be initiated is reduced to a very brief period.

Advantageously, the torrefaction and the cooling are carried out in a single chamber extending vertically and equipped with leak-proof devices for the introduction of the product at the upper part and for its evacuation at the lower part, non-oxidizing gas at high temperature being directed to the upper part under a pressure greater than atmospheric pressure, —non-oxidizing gas at low temperature being directed to the lower part under a pressure greater than atmospheric pressure, a means for extraction being provided in order to move the product which is torrefied in the upper region of the chamber to the lower region, where it cools down. A compact unit in which heat losses are reduced in thereby obtained. Additionally, the regulation of the operation is facilitated: if, for example, following an overheating, the introduction of hot gas is reduced, an afflux of cold gas which amplifies the effect results therefrom in the central part, and temperature lag is therefore reduced.

Advantageously, a part of the non-oxidizing gas evacuated from the central region of the chamber is redirected to the upper part of the chamber. This enables the atmosphere required at the upper part of the furnace to be obtained, heat losses being restricted.

Also advantageously, drying precedes torrefaction without intermediate cooling and this drying is preferably carried out using hot gases originating from the torrefaction. This is the drying at temperatures below 100° C. The measure just mentioned restrict energy losses further.

The product of the invention is suitable for many applications.

In fact, it forms a high-grade raw material for a whole range of chemical treatments, including combustion which will be discussed later. It should also be noted that the rot-proofness may be taken advantage of, to form, by mixing with concrete, light insulating agglomerates for use in the building industry. It should also be noted that it may be added to various wastes from forest plantations or from wood industries which would otherwise be practically unusable, and which may thus be used easily, for example, in a burner.

The application of the product of the invention to energy production will now be described in greater detail.

Preferably, according to this application, almost all the pyroligneous substances contained in the torrefied product are extracted by distillation, the remaining carbon is converted into carbon monoxide, the heat produced by this reaction being used for carrying out the distillation, and the whole of the mixture of pyroligneous substances and carbon monoxide is directed to a burner, the temperature of the pyroligneous substances being maintained above their dew point.

According to advantageous embodiments:

The distillation of pyroligneous substances and the conversion of carbon into carbon monoxide are carried out in the same hearth, which is provided with one or more passages for gas in order to sweep away the pyroligneous substances on the one hand, and one or more passages for air, for the conversion of carbon into carbon monoxide on the other hand, the hearth containing a common outlet for the pyroligneous substances distilled and for the carbon monoxide.

The gas intended for sweeping away the pyroligneous substances passes, in the direction of increasing temperature, through a mass of torrefied product of sufficient thickness to ensure a substantially constant flowrate.

The hearth is of the vertical type, the torrefied product moving downwards in this hearth, the sweeping gas passing downwards through the mass of the torrefied product, the air inlet(s) for the conversion of carbon being located above a layer of ash maintained at a substantially constant level, and the common outlet for the pyroligneous substances and the carbon monoxide being located between the level of the ash and that of the base of the distillation region.

An air induction type pilot burner capable of generating within the hearth a drop in pressure sufficient to suck in the sweeping gas and the air for the conversion of carbon is used.

The invention will now be described in greater detail using practical examples illustrated with accompanying drawings.

DETAILED DESCRIPTION OF THE PREFERRED EMBODIMENTS

Figure 1:
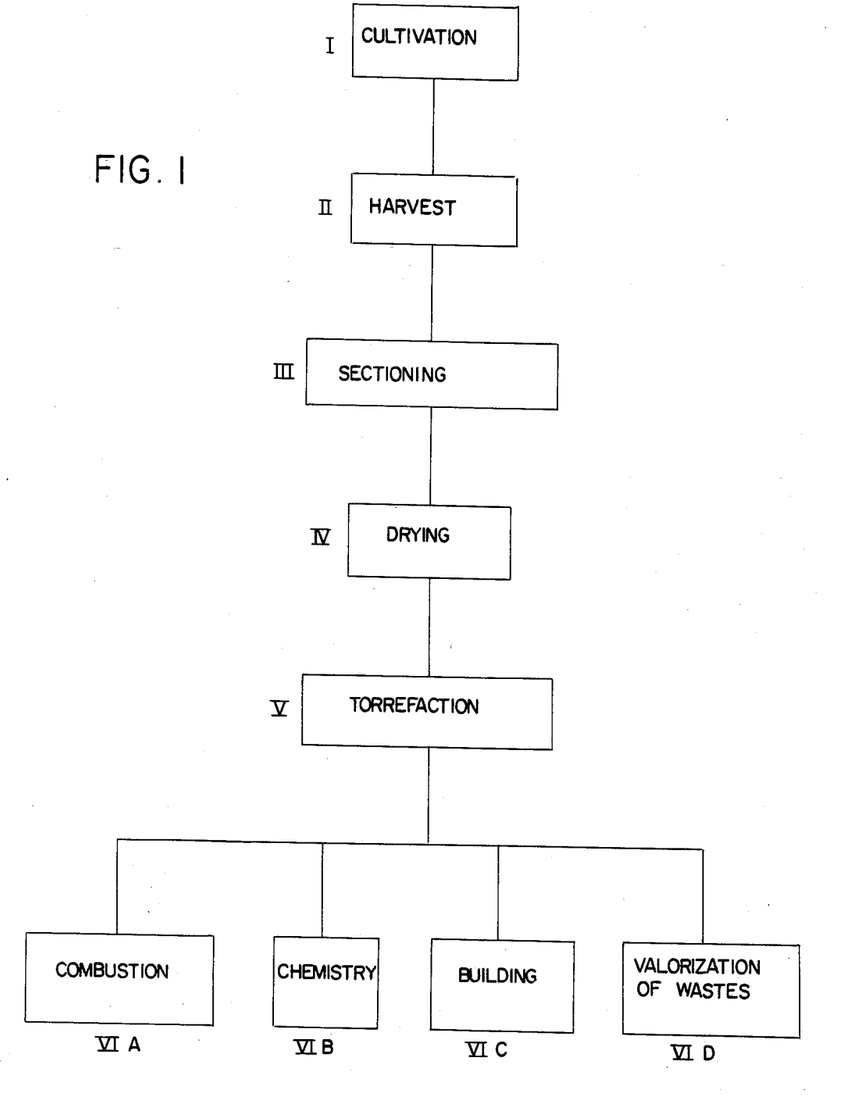
FIG. 1 is a block diagram of the whole of the process.

The diagram of FIG. 1 shows the following successive stages of the process:

- cultivation I - harvest II - cutting III - drying of the green sections IV - torrefaction V - application to energy production VIA or to chemistry VIB or in the building industry VIC or to the treatment of combustible wastes VID.

The process employed for the cultivation and the intensive production in an annual cycle, with mechanical harvest to the torrefiable woody substance in the form of vertical suckers or stems of small diameters, while aiming at increasing the vegetative period of the tress grown for this purpose, comprises the implementation of a harvesting cut without disturbing the collar of the tree on the one hand and determining the establishment of a highly branched structure close to ground level on the other, enabling the life of the trees to be extended and the harvest of the suckers to be mechanized.

It is known that the collar of the tree is the region (or the section) of the tree which separates, at the soil surface, the bundle of roots from the aerial part consisting of the trunk and the branches. An annular destruction of this collar by close cutting brings about a decline in health of the specimen within a short period of time.

Experience shows that the collar of the tree is saved if the cutting is carried out above ground, even at a short distance of, for example, 10 cm, provided that the portion of the stem remaining in the soil which would form the short trunk is no longer affected by the following cuts.

The process is also defined in that at the end of the year of planting, the first cutting of the rooted or transplanted specimens is carried out along a plane equidistant from the soil, located some 10 cm above its surface, the stems remaining in the soil being intended to form the short trunks of the future trees.

The cuts which follow are more productive because the root bundles are well established and many suckers will have formed.

According to the invention, close cutting are carried out when the branches reach 1.5 to 2 centimeters in diameter at the base and 150 to 200 centimeters in height, it being possible for their density to exceed 100 stems per square meter.

The harvesting period in Europe is between November and February, in fact, the leaves have dropped during this period; the shoots of the year have "lignified", i.e., changed into wood; the bark adheres to the wood of the stems, the amount of sap has decreased and the energy required for drying will be lower.

Moreover, it is known that some species of trees such as fruit trees are subject to annual prunings which leave on the branches the bases of the annular growths which most frequently have the shape of crooks. These carry the buds which will be the points of the initiation of shoots in the following year. This type of management which does not affect the life of the tree enables the branches to be brought into shape.

The process according to the invention is also defined in that the annual harvest of the stems from the branches is carried out by mechanized cuttings along planes equidistant from the soil, but raised by some 2 centimeters per year, so that the stem bases remaining on the branches having the shape of crooks and carrying the buds which give rise to the shoots of he following year contribute to the expansion of the highly branched structure of the tree close to the ground.

Another feature of the invention relates to the distance between individuals within a same row of trees. It must be such that their expansion which determines the survival of each tree is adequate. Meanwhile, the distance to be established between rows will be increased by the space required for the free passage of the wheels of machines which must rest on the ground in the space between the rows, this space being maintained by corrective prunings if required.

After the harvest, the open passage is used for carrying out the operations relating to amendments, treatments or for loosening the soil or for hoeing it.

Figure 2:
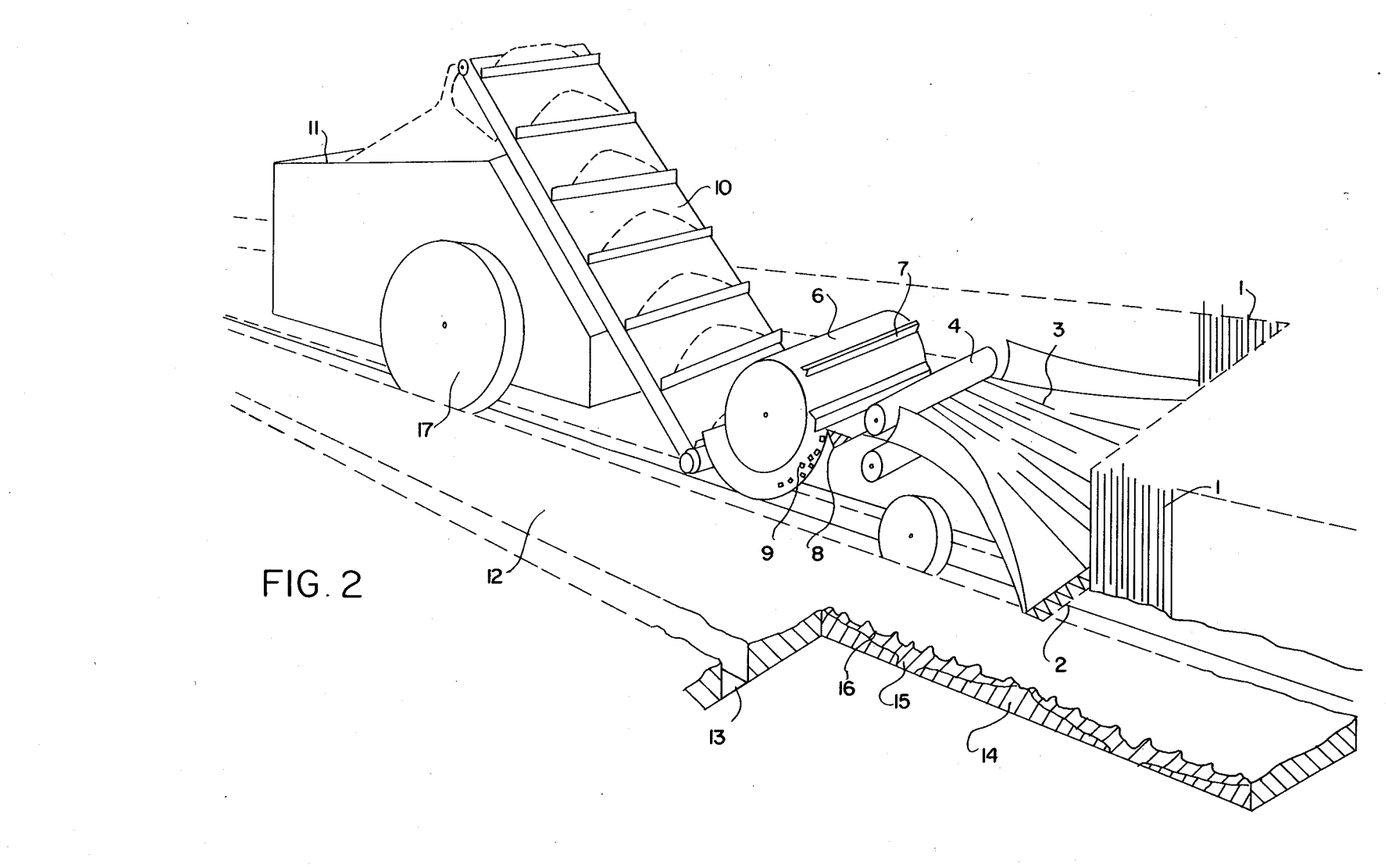
FIG. 2 is a perspective view of a harvesting device in an operating position.

The invention also comprises a harvesting device represented diagrammatically in the operating position in FIG. 2. The high density of suckers to be harvested is shown at 1. The front-mounted cutter bar 2 of the machine is of the same type as those used for the harvest of cereals. The cut suckers 3 are directed towards the feeding rollers 4 which regulate the speed of their movement towards the chopper drum 6 containing the radial blades 7 rotating past the fixed blade 8. This shearing slices the suckers and divides them into small sections of short length 9. The latter are taken up by an elevator 10 and conveyed towards the skip 11.

The surface 12 represents those left behind after the harvesting machine has been in use.

A cross-section along a vertical plane located in the axis of a row of trees after the harvest is shown at 14. The short trunks 15 and the highly branched structure 16 of 2 trees are distinguished therein.

The passageway reopened, after the harvest, required for the free passage of the wheels of the machine 17 is shown at 13.

The harvesting device according to the invention is defined in that it successively straddles over the rows of trees and comprises a front-mounted cutter bar 2, the height of which can be adjusted, determines, on raising each year, that of the cutting plane above the ground, the said bar making it possible, by its action, to harvest the suckers of the year and similarly to reopen the passage 13 intended for the wheels of the device, the passage previously occupied by the suckers, facing each other and belonging to 2 consecutive rows of trees, the device simultaneously carrying out the slicing 6 of the suckers into sections 9 of short length collected in the skip 11.

By way of example, the height of the cutter bar 2 of the harvesting device, for the suckers of trees which have been in production for 20 years, must be adjusted at 48 centimeters. In fact, to the 10 centimeters (height of the first cut) should be added, 19×2 centimeters (value by which the height is raised annually), the result of which operation is indeed 48 centimeters.

The torrefiable woody product obtained exclusively consists of small sections, resulting from the slicing of branches, roughly cylindrical, covered with their bark, the latter contributing to a large extent to the quality and the appearance of the final fuel to be obtained and being a characteristic thereof.

The process employed for the cultivation of very different species of tree and shrubs with a view to harvesting the woody production thereof will be advantageously applied in Europe or under similar climates to the production of Laburnum which provides a high density of suckers and takes up the nitrogen required by it from the atmospheric air, or alternatively of the apple tree or the pear tree which have the exceptional property of providing, after the torrefaction of the sections, a fuel with a bulk density of the order of 420 kg/m$^3$.

The sections, as defined above, contain, depending on the nature of the wood they consist of, a relatively high quantity of water of between 40 and 60%. This water should necessarily be eliminated before torrefaction can be carried out.

The process according to the invention provides for an intensive extraction of water still contained in the sections, the ducts of which have been opened at the two ends during the slicing, using a fast flow of high temperature gas sweeping their surfaces.

The process of roasting and torrefaction in a neutral atmosphere, of fragments of wood, which are still moist, continuously brought in and collected into a mass the height of which is kept constant, in a vertically placed, truncated-shaped reactor, is defined in that, set in motion by virtue of the low pressure created across the mass, the neutral heat-exchanging gas is raised to a temperature above that required to achieve the torrefaction of the wood and sufficient to carry out, by roasting, an intensive drying out of the fragments as soon as they are deposited in the reactor, drying resulting in a lowering of the temperature of the gases which, mixed with the steam evolved constitute the neutral gaseous flow and brought back to the temperature capable of enduring, while it passes through it, the torrefaction of the mass.

It is a feature of the torrefaction method according to the invention to make use of the water contained in the wood itself, converted into steam, as one of the constituents of the neutral atmosphere in which the torrefaction must be carried out.

In order to achieve the object of the process described above, it is indispensable that the heat exchanges between the heat-exchanging gas and the fragments of wood are rapid. This result is obtained by the use of a gas flow, surrounding the fragments, circulating at a high speed and with a temperature lag sufficient to ensure firstly the roasting giving rise to the initial drying of the wood and secondly its torrefaction.

It is also understood that it is economically advantageous to carry out the operations of drying and torrefaction immediately in succession in the same equipment.

Figure 3:
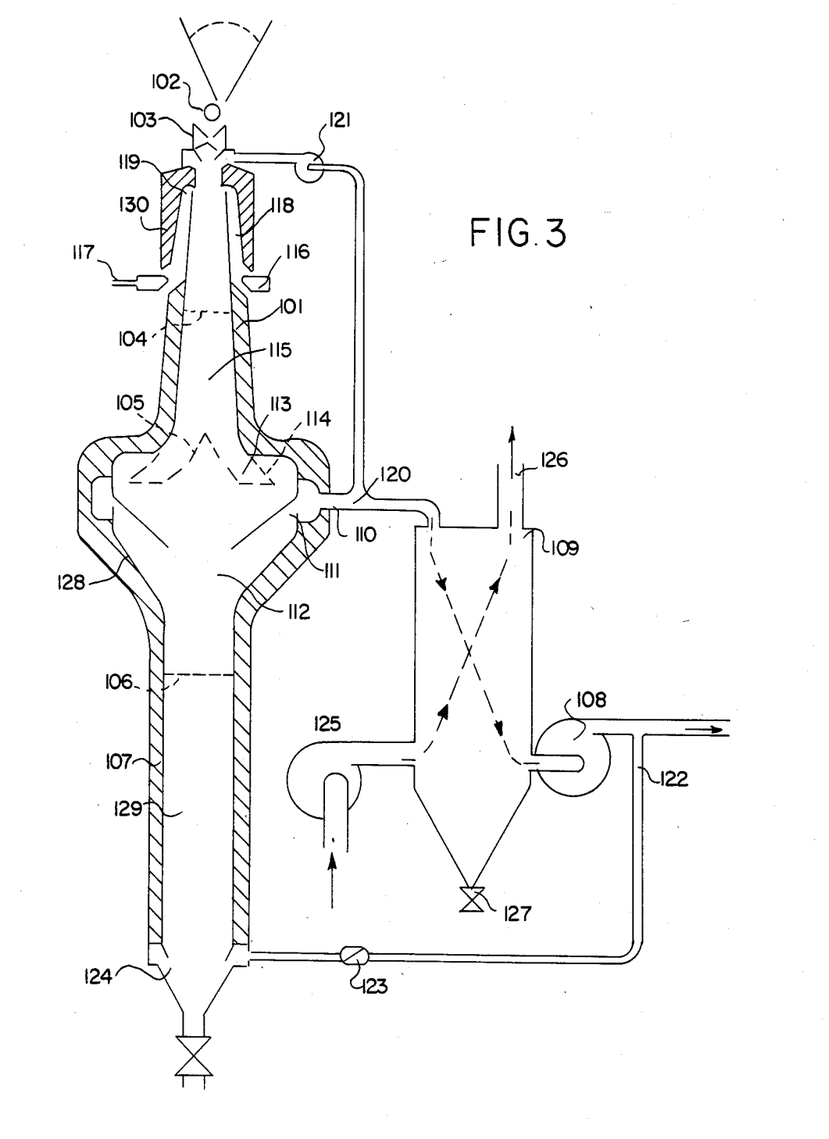
FIG. 3 is a diagrammatic cross-section of a torrefier.

The description which follows of a device, shown in diagrammatic cross-section in FIG. 3, according to the invention and the way in which it operates will enable the process to be understood better.

The device comprises essentially an equipment called reactor 101 in which are carried out the operations of roasting producing the initial drying, followed by torrefaction of the fragments of wood continuously brought in by the feeder 102. The fragments pass through the baffle plates 103, the purpose of which be described later, before being deposited on the roasting bed 104. This bed is maintained at constant height by the action of a rotary plate extractor 105 which continuously removes the wood once torrefied. The running speeds of the feeder and the extractor are adjusted in a suitable ratio which takes into account the withdrawal which accompanies the drying and the torrefaction. The residence time in the reactor is determined by the transfer rate.

On extraction from the reactor, the torrefied wood is deposited at the top 106 of the mass collected in the receptacle 107. This latter, of a certain capacity is equipped at its base with a suitable double-lock system, not shown, which enables the torrefied wood to be withdrawn in successive baskets, without allowing air to penetrate into the device.

A high pressure fan 108 lowers the pressure in the device comprising the receptacle, the extractor and the reactor. This low pressure is conveyed to the device through the condenser-exchanger 109, the pipe 110, the annular nozzle 111 and the opening 112. It is applied to the mass 115 in the course of the treatment passing through the rotary and perforated blade 105 at the base of the skirt of the reactor 113 which is also perforated and the annular space 114 occupied by fragments of torrefied wood during the transfer.

The large surface area that these parts located at the base of the reactor offer to the passage of the gaseous flow should be noted. This arrangement slows down the flow-rate the brisk force of which is no longer sufficient to carry away the fragments located in the space 114.

This low pressure sets in motion the flow of the heat-exchanging gas circulating at high speed between the fragments of wood deposited on the bed 104, flow used for successive treatments of roasting and torrefaction of the wood.

The process according to the invention is also defined in that the heat-exchanging gas consists of a mixture of a large part of recycled neutral gases taken up from the outlet of the reactor 101, and which are therefore at the torrefaction temperature, and burnt gases resulting from the combustion in the chamber 118 of a combustible gas supplied to the burner 116, the temperature of which mixture, being two to three times greater than that applied during the torrefaction which will follow, is capable of carrying out on the fixed bed 104 of the reactor 101 the initial roasting of the moist wood.

The recycled gas is taken up into the circuit at 120 with the aid of the blower 121. The combustible gas is brought to the annular burner 116 through the pipe 117.

The blower 121 brings back the gas taken up at the outlet of the reactor at a pressure sufficient to feed the reactor 101 and to create across the baffle plate 103 a slight increase in pressure against the entry of air at this level, but allowing the entry of the fragments of wood brought by the feeder 102.

The combustible gas will advantageously be that obtained from a portion of the torrefied wood itself, taken up from the production and gasified. The order of magnitude of the amount consumed is approximately 10% to 12%.

The time required for the successive operations of roasting giving rise to the intensive drying of the wood and its torrefaction settles down between 3 and 6 minutes depending on the temperatures employed and the means size of the fragments (less than or equal to 1 cm$^3$). These times which are given by way of example are not limiting. They correspond to the mean residence time of the fragments in the reactor.

The gas from the reactor which has not been recycled passes through the exchanger 109 before being released into the atmosphere. This exchanger is also a condenser, it enables the water collected at 127 and evacuated with a pump, which is not shown, to be extracted and the calories contained in the gas to be recovered. These calories are transferred to ambient air brought to the exchanger 109 by the fan 125 and driven, passing through the pipe 126, towards a wood drier, not shown, installed upstream of the reactor. The purpose of this drier is to decrease by approximately 50% the water content of the wood, which is the raw material and to preheat it to a temperature in the vicinity of 90° C. These techniques are sufficiently known so that they need not be described in detail.

The process according to the invention is also defined in that a part of the neutral gases, cooled on passing through the exchanger 109 and introduced by the annular nozzle 124 at the base of the receptacle 107 is set in motion by the low pressure prevailing in the device and passes through the mass 129 of torrefied wood in order to extract therefrom the recoverable calories and to reduce the temperature therein so as to prevent the possible spontaneous ignition during the exposure to the atmosphere of the wood at the torrefaction temperature.

In view of the temperatures employed, the whole of the device is covered with a heat insulator 128.

As it is brought to high temperature, the combustion chamber 118 is covered with a fire-proof cover 130, the purpose of this chamber being to ensure the complete combustion of the combustible mixture which is achieved without an excess of air. In fact, the gaseous flow must be neutral.

The upper part of the reactor forms part of the combustion chamber. With its internal radius, it contributes to the homogeneity of temperature over the entire section of the heat-exchanging flow.

The neutral gases, cooled by the exchanger 109 and extracted by the fan 108 contain a certain proportion of smokes consisting of tars formed especially during the roasting carried out in the reactor 101.

In order to prevent these smokes from being wasted and to reintegrate into the fuel and in this form one of the component parts, the process is finally defined in that the gases are filtered by passing through a large mass of wood already torrefied and collected in a transfer silo operating continuously before the storage of the same fuel.

The tars deposited in very small amounts at the surface of the fragments easily diffuse into the wood which has become porous after the torrefaction.

The arrangements made for the determination of pressures, flowrates and temperatures and also for monitoring the operation of the device depart from the scope of the invention and have therefore not been described.

The torrefaction carried at 250°-280° C. in an equipment as just described, results in its water content being fixed at 3% and produces a product with stable characteristics therefrom. Besides, it is known that torrefaction does not remove from the wood pyroligneous products which represent approximately 50% of the total energy potential. The torrefied wood has a calorific value of the order of 5,200 kcal/Kg. It lends itself to mechanised handling without forming dusts. It keeps well even in wet premises. It ignites easily. Pyroligneous vapors may be extracted between 250° and 350° C., tars at about 350° to 500° C., and charcoal remains beyond this temperature.

Finally, it is known that in the technology of the so-called induction gas burners, use is made of axial (venturi) or annular nozzle tuyeres, supplied with the so-called inductor fluid under pressure whereas upstream of the nozzle the resultant low pressure sets in motion the so-called induced fluid. The pilot and inductor fluid may be fuel gas or air which may be previously heated.

In the combustion device which will be described the initial fuel that the torrefied wood represents is converted into a mixture of pyroligneous vapors and carbon monoxide intended to be supplied to a burner capable of providing a continuous flame which may be used in thermal equipment which exist in substitution for oil or gas burners.

The combustion device, which consists of firstly, the hearth, the main object of which is to enable pyroligneous vapors to be extracted, this operation being carried out by virtue of the calories originating from the partial combustion of charcoal, which is the residue of the extraction, the partial combustion additionally providing a certain quantity of carbon monoxide, and secondly, the burner, the object of which is to ensure the complete combustion of the combustible mixture reduced in the hearth, this device being defined in that the hearth and burner are combining into a single unit so that the temperature of the vapors and of the pipe for the transfer cannot be lowered below the condensation temperature of the heaviest fraction distilled.

The combustion device may cover two embodiments: in the first, the hearth and the burner are coupled, and the tuyere tube itself forms the region raised to a high temperature where the flame front settles down; in the second, the hearth and the burner are separated by a pipe, which is thermally isolated and contains the tuyere, in which the inflammable mixture flows at a speed greater than that of the flame propagation, this latter settling down and intensifying in the truncated combustion chamber located at the end of the pipe. The burner may be lit electrically as known per se.

The supply of torrefied wood to the device is carried out mechanically and is aimed at keeping filled a tubular column open at the top located above the hearth so that the height occupied by the torrefied wood in the latter and the pressure loss of an airflow passing through it downwards are constant.

The supply of pilot air which ensures the combustion of the vapors and of the combustible gases in the tuyere, creates upstream a low pressure which enables the combustion air to be introduced at the level of the hearth on the one hand the pyroligneous vapors to be swept downwards and through the torrefied wood supply column, on the other.

According to the invention, the hearth consisting of embers resulting from the partial combustion of charcoal rests on a floor made up of the bed of ash itself. The stable position of the bed in the device is obtained by the use of a mechanical extractor.

Figure 4:
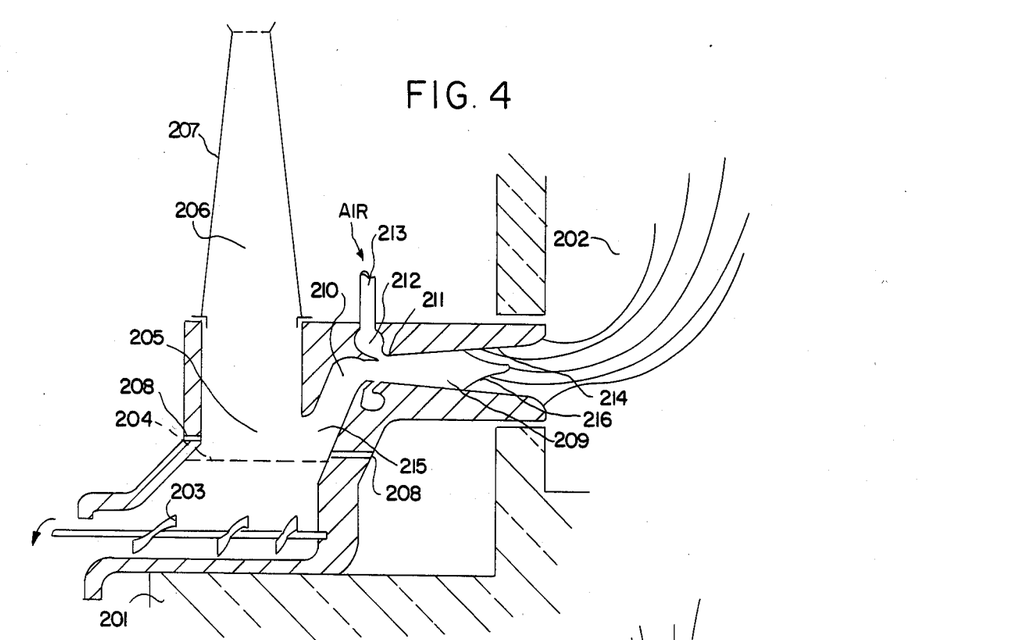
FIG. 4 is a diagrammatic cross-section of equipment for the combustion of the product.

FIG. 4 represents the device resting on a bracket 201 in the vicinity of the peephole of a thermal chamber to be heated 202.

The screw 203 intended for the mechanical extraction of ash, above which the bed of ash 204 on which the ember region 205 surmounted by the reserve of torrefied wood 206 filling the removable pipe 207 rests is located is shown in the base of the device in diagrammatic cross-section.

At the level of the ember region, that is 10 to 20 cm above the ash, holes 208 through which the air for the combustion of charcoal is introduced, are made in the wall of the body of the device.

The inner chamber of the device then develops towards the tuyere 209. The slope for the fall-back 215 formed by the glowing embers is seen at the base of the connecting pipe 210 inclined upwards.

The annular nozzle 211 communicating with the chamber 212 and the pipe 213 for the supply of pilot air at air for the combustion of vapors and gas in the burner are located at the constriction of the tuyere.

The diverging part 214 of the tuyere has a large diameter as its forms the combustion chamber itself, in which the flame front settles down in the burner.

A low pressure resulting from the very principle of operation of the tuyere is created upstream of the burner, i.e., in the hearth itself.

The starting up and operation of the device may be carried out as follows: a batch of ash is used to form the initial floor. Charcoal is deposited on the latter up to the level of the fall-back slope 215. The pilot air pressure is set up in the chamber 212. The flow of air in the nozzle 211 creates a low pressure in the hearth. After removing the removable pipe 207, the charcoal placed on the bed of ash is ignited with a flame and the tube 207 is then replaced in its position and filled with torrefied wood. Almost immediately, the device emits a dense white smoke leaving the tuyere 214, being pyroligneous vapors, which may then be ignited. An electric device, not shown, may be used for this purpose.

As a result of the low pressure created in the hearth, air penetrates through the holes 208 provided for this purpose and maintains the combustion of the charcoal. The same low pressure draws in a weak current of air circulating downwards in the tube 207 passing through the torrefied wood. This air flow sweeps the pyroligneous vapors extracted at the approach of the hearth, drives them towards the supply pipe to the burner, where they mix with the very hot carbon monoxide in the hearth and then, finally, with the preheated pilot air supplied to the burner to form in the latter the flame front which will develop in the thermal chamber 207.

Figure 5:
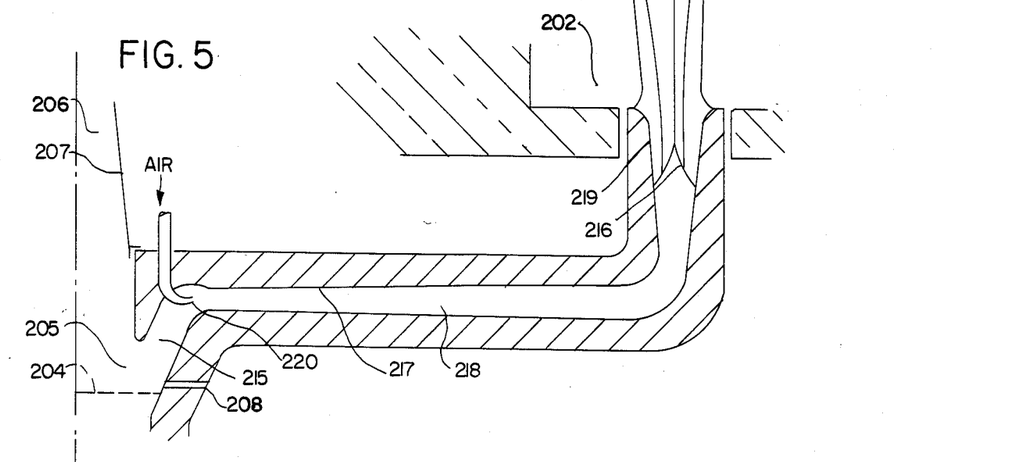
FIG. 5 is a diagrammatic cross-section of a variant of FIG. 4.

FIG. 5 represents a variant of the device in which the injector tube of the tuyere 217, of the venturi type, is much more elongated. The creation in the pipe 218 of a flowrate of the inflammable mixture greater than that of the propagation of the flame which will then be set up in a second injector tube of larger diameter 219, located at the end of the pipe 218, results therefrom. This arrangement makes it possible to supply a furnace in the proximity of which it is impossible to place the device of FIG. 4 satisfactorily.

The pipe 218 must be suitably insulated so as not to allow a lowering of temperature of the pyroligneous vapors, and the for the same reason, the air for the combustion introduced to the axial injector 220 must be adequately preheated.

It should be noted that the geometric configurations of the product of the invention ensures its regular descent towards the hot region of the hearth, and a constant mass permeability for the sweeping air. A high steadiness of temperature distribution, and consequently of the composition of the combustible mixture supplied to the burner results therefrom.

I claim:

1. A process for producing torrefied wood products which can be burned to produce thermal energy from plants which produce substantially straight, unbarked woody suckers having diameters of 5 to 20 mm, said process comprising the steps of
   (a) cutting said substantially straight, unbarked woody suckers having diameters of 5 to 20 mm from said plants,
   (b) sectioning said substantially straight, unbarked woody suckers so as to produce unbarked green sticks of a uniform length, said uniform length being between about 10 and 25 mm,
   (c) placing said unbarked green sticks provided in step (b) in a reactor so as to form a bed therein,
   (d) passing a hot, non-oxidizing gas having a temperature greater than 280° C. through said bed so as to first dry and then torrify the unbarked green sticks therein, thus providing torrefied wood products, the velocity of said hot, non-oxidizing gas being sufficiently low to avoid conveying of torrefied wood products away from said bed yet sufficiently high to raise the temperature of the unbarked green sticks from 100° C. to a torrification temperature of 250° to 280° C. in no more than 10 minutes, and
   (e) cooling said torrefied wood products.

2. The process according to claim 1, wherein in step (a) the substantially straight, unbarked woody suckers are cut from said plants at a level above a collar thereof.

3. The process according to claim 1, wherein the substantially straight, unbarked woody suckers cut from said plants in step (a) have a length of 1.5 to 2 meters.

4. The process according to claim 1, wherein the substantially straight, unbarked woody suckers cut from said plants in step (a) have no leaves thereon.

5. The process according to claim 1, wherein in step (b) said substantially straight, unbarked woody suckers are aligned in parallel and then cut by at least one rotating cutting blade.

6. The process according to claim 1, wherein said hot, non-oxidizing gas consists essentially of a mixture of water vapor and combustion gas.

7. The process according to claim 6, wherein a first portion of said hot, non-oxidizing gas, after passing through said bed, is recirculated so as to again pass through said bed.

8. The process according to claim 7, wherein between steps (d) and (e) said torrefied wood products are removed from said bed and accumulated in a mass and wherein in step (e) a cool, non-oxidizing gas is passed through said mass.

9. The process according to claim 8, wherein a second portion of said hot, non-oxidizing gas, after passing through said bed, is cooled to provide said cool, non-oxidizing gas.

10. The process according to claim 6, wherein said hot, non-oxidizing gas is passed downwardly through said bed.

11. The process according to claim 9, wherein said cool, non-oxidizing gas is passed upwardly through said mass.

12. The process according to claim 1, wherein said plants in step (a) are laburnum.

13. The process according to claim 1, wherein said plants in step (a) are apple trees.

14. The process according to claim 1, wherein said plants in step (a) are pear trees.

15. Torrefied, unbarked wood products which are generally cylindrical in shape and which have diameters between 5 and 20 mm and uniform lengths of about 10 and 25 mm, said torrefied, unbarked wood products being made by the steps of
 (a) cutting substantially straight, unbarked woody suckers having diameters of 5 to 20 mm from plants,
 (b) sectioning said substantially straight, unbarked woody suckers so as to produce unbarked green sticks of a uniform length, said uniform length being between about 10 and 25 mm,
 (c) placing said unbarked green sticks provided in step (b) in a reactor so as to form a bed therein,
 (d) passing a hot, non-oxidizing gas having a temperature greater than 280° C. through said bed so as to first dry and then torrify the unbarked green sticks therein, thus providing torrefied wood products, the velocity of said hot, non-oxidizing gas being sufficiently low to avoid conveying of torrefied wood products away from said bed yet sufficiently high to raise the temperature of the unbarked green sticks from 100° C. to a torrification temperature of 250° to 280° C. in no more than 10 minutes, and
 (e) cooling said torrefied wood products.

16. Torrefied wood products according to claim 15, wherein said plants in step (a) are laburnum.

17. Torrefied wood products according to claim 15, wherein said plants in step (a) are applied trees.

18. Torrefied wood products according to claim 15, wherein said plants in step (a) are pear trees

* * * * *